United States Patent [19]
Kanai et al.

[11] Patent Number: 5,003,559
[45] Date of Patent: Mar. 26, 1991

[54] DIGITAL TRANSMISSION SYSTEM

[75] Inventors: Takashi Kanai; Minoru Inayama, both of Shinagawa, Japan

[73] Assignee: Sony Corporation, Tokyo, Japan

[21] Appl. No.: 233,614

[22] PCT Filed: Nov. 27, 1987

[86] PCT No.: PCT/JP87/00924
§ 371 Date: Jul. 27, 1988
§ 102(e) Date: Jul. 27, 1988

[87] PCT Pub. No.: WO88/04119
PCT Pub. Date: Jun. 2, 1988

[30] Foreign Application Priority Data

Nov. 28, 1986 [JP] Japan ............... 61-283501

[51] Int. Cl.⁵ ............................... H04L 7/02
[52] U.S. Cl. .................... 375/109; 375/118; 360/32
[58] Field of Search ............ 375/109, 25, 118; 370/105.1, 105.3, 103; 358/149, 410, ; 360/32, 51

[56] References Cited

U.S. PATENT DOCUMENTS 4,381,525  4/1983  Senoo et al. ............... 360/32
4,617,599  10/1986  Noguchi et al. ............ 360/32
4,644,546  2/1987  Doi et al. ............... 340/825.44 X

FOREIGN PATENT DOCUMENTS 53-42363  11/1978  Japan .
55-27743  7/1980  Japan .
57-76956  5/1982  Japan .
58-53807  12/1983  Japan .

Primary Examiner—Benedict V. Safourek
Assistant Examiner—Tesfaldet Bocure
Attorney, Agent, or Firm—Hill, Van Santen, Steadman & Simpson

[57] ABSTRACT

The present invention relates to a digital transmission system provided with a transmitter 11 and a receiver 12, wherein the transmitter 11 comprises a first clock extracting device 13, 14 for detecting a synchronizing signal contained in a first digital audio interface (DAI) format signal from the receiver 12 and generating a first clock signal of a predetermined frequency in being phase-locked with the synchronizing signal, a data read-out device 4 for reading out data from a recording medium on the basis of the first clock signal, and a first encoder 5 for encoding the data from the data read-out device 4 in a second digital audio interface (DAI) format signal on the basis of the first clock signal, while the receiver 12 comprises second clock extracting device 6, 7 for detecting a synchronizing signal contained in the second DAI format signal and generating a second clock signal of a predetermined frequency in being phase-locked with the synchronizing signal, a decoder 8 for decoding data from the second DAI format signal on the basis of the second clock signal, an oscillator 3 for generating a master clock, D/A a converter 9 for digital-to-analog converting the decoded data on the basis of the master clock, and a second encoder 15 for encoding the master clock to derive the first DAI format signal, whereby the system is synchronously operated by the master clock in a manner that digital-to-analog conversion can be effected with a timing clock signal which is not mixed with jitter.

5 Claims, 6 Drawing Sheets

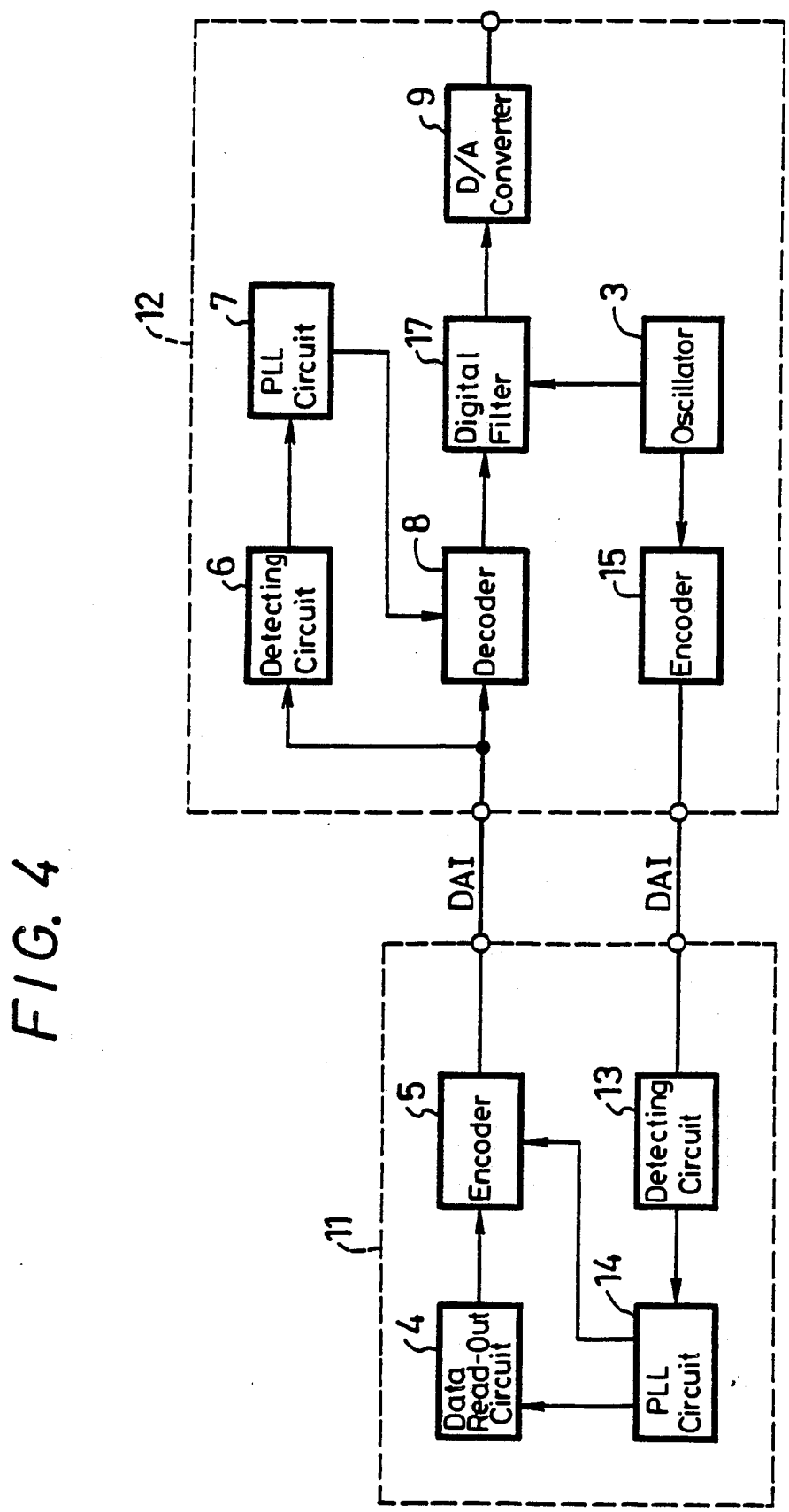

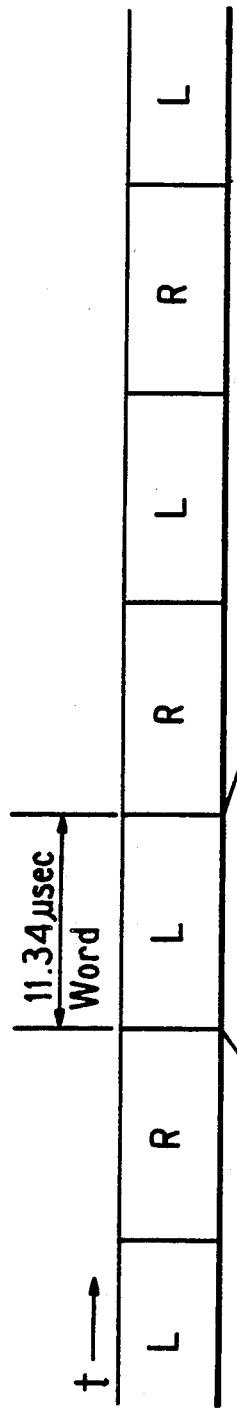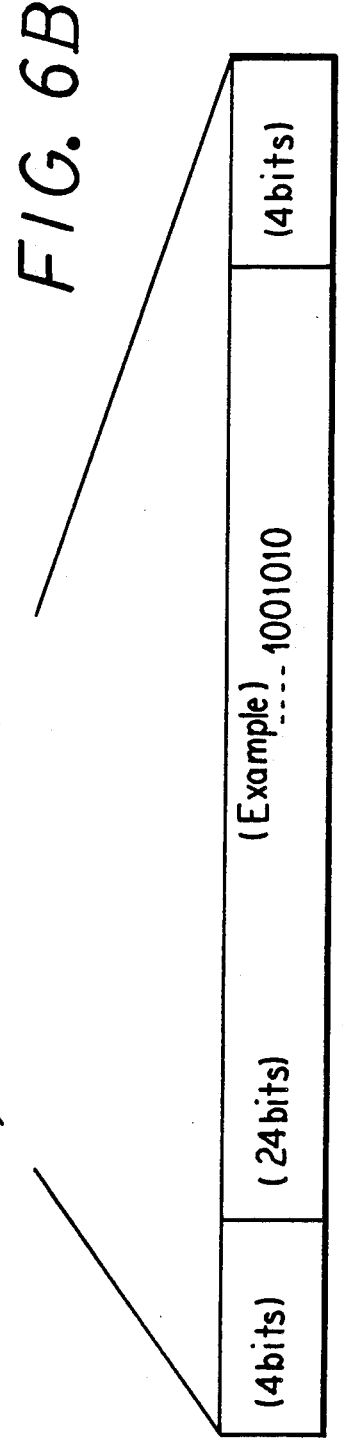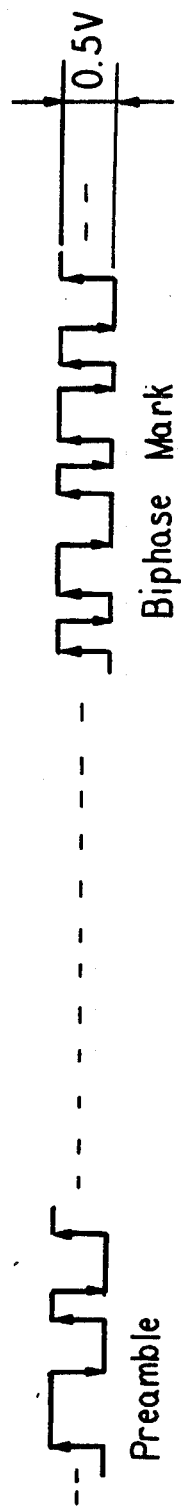

DIGITAL TRANSMISSION SYSTEM

TECHNICAL FIELD

The present invention relates to a digital transmission system for transmitting data by a digital audio interface (hereinafter abbreviated as "DAI"), and more particularly to a digital transmission system which is provided in its receiver side with an oscillator for generating a master clock which is supplied directly to a D/A converter as well as to its transmitter side through the DAI for synchronization with digital reading, wherein reproduced data is transmitted through the DAI to the receiver side to thereby reduce the occurrence of jitter in a timing for D/A conversion.

BACKGROUND OF THE INVENTION

A digital audio interface (DAI) transmission system as shown in FIG. 1 is known as one of digital transmission systems. Since the DAI transmits L-channel and R-channel data through a single digital cable, it employs a time-division-multiplexing transmission system which permits the L-channel and R-channel data to be alternately transmitted and received, as shown in FIG. 6A. If the sampling frequency is chosen to be, for example, 44.1 kHz as in the case of the compact disc, 44100 samples of the respective R-channel and L-channel data, that is, totally 88200 samples of data of both the channels are transmitted per second. One channel data period (word) is 11.34 sec. One word is formed of 32 bits which are divided, for example, as shown in FIG. 6B. Specifically, in the same figure, the first four bits are assigned to be a SYNC portion for synchronization in which a preamble, later referred to, is inserted. The subsequent portion, for storing audio data, has a capacity of 24 bits. However, in many cases audio data is formed of 16 bits as the compact disc, so that only 16 bits from the end are presently used. The last four bits are assigned to be a control portion for storing information added to the data such as ON/OFF of emphasis, sub-code and so on.

The data thus arranged is subjected to a so-called biphase mark modulation in which data "0" corresponds to one transition and data "1" corresponds to two transitions as shown in FIG. 6C. However, the SYNC portion is an exception and written with a particular pattern called "preamble". In the preamble, the correspondent relationship between the transition and the data values is ignored so that this portion has a high-level period longer than any other portion.

In FIG. 1, reference numeral 1 designates a transmitter such as a compact disc player, and 2 a receiver such as a D/A converter system. The transmitter 1 comprises an oscillator 3 for generating a master clock of a predetermined frequency, a data read-out circuit 4 for reading out data from a recording medium (not shown), for example a compact disc or the like, on the basis of the master clock, and an encoder 5 for encoding the data read out on the basis of the master clock in accordance with a DAI format signal.

The receiver 2 comprises a detecting circuit 6 for detecting a synchronizing signal having a frequency, for example, double the frequency of the audio data sampling frequency fs from the above-mentioned DAI format signal, a PLL circuit 7 for generating a clock signal having a frequency, for example, 256 times the sampling frequency fs and phase-locked with the detected synchronizing signal, a decoder 8 for decoding the input signal on the basis of the clock signal, and a D/A converter 9 for converting the digital decoded signal to an analog signal.

The encoder 5 of the transmitter 1 supplies the receiver 2 with a DAI format signal Rx as shown in FIG. 5A. The upper portion of FIG. 5A shows in detail the waveform of the DAI format signal Rx, and the lower portion of FIG. 5A typically shows the same DAI format signal Rx. Such the DAI format signal Rx is supplied to the detecting circuit 6. In the detecting circuit 6, a synchronizing signal 2FSR having one edge (a rising edge) per one SYNC as shown in FIG. 5B is detected. The synchronizing signal 2FSR has the frequency double the sampling frequency fs, as described above.

The synchronizing signal 2FSR from the detecting circuit 2 is supplied to a phase comparator circuit (not shown) of the PLL circuit 7, wherein it is phase-compared with a fed-back signal 2FSV (FIG. 5F) from a frequency divider (not shown). Then, a phase comparison error signal is converted to a direct current voltage by a loop filter (not shown), and the oscillating frequency of an oscillator (not shown) is controlled on the basis of this direct current voltage, whereby a clock signal for decoding the DAI format signal Rx is derived at the output side of the PLL circuit 7, that is, at the output side of the oscillator.

The clock signal thus derived from the PLL circuit 7 is supplied to the decoder 8 together with the DAI format signal Rx, wherein the DAI format signal Rx is decoded on the basis of the clock signal. Consequently, 16-bit serial digital data DATA, a clock BCK for shifting the same, and LRCK for identifying the L-channel and the R-channel, as shown in FIG. 5C, are derived at the output side of the decoder 8.

These outputs are supplied to an S/P converting circuit (not shown), whereby parallel data PDATA having 16 bits per channel, as shown in FIG. 5D, is derived at the rising edge of the clock LRCK, that is, at the end point of the R-channel at the output side of the S/P converting circuit. The parallel data PDATA is supplied to the D/A converter 9 together with the clock signal from the PLL circuit 7, and consequently an output current $I_{OUT}$ corresponding to the parallel data PDATA as shown in FIG. 5E is taken out at the output side thereof as an analog signal.

In the case of a conventional system constructed as shown in FIG. 1, however, the synchronizing signal is generated from the oscillator 3 of the transmitter 1 on the basis of the master clock as mentioned above, and the PLL circuit 7 of the receiver 2 generates a variety of clock signals on the basis of this synchronizing signal to operate in synchronism with the transmitter 1, wherein one of the clock signals is supplied to the D/A converter 9 to be used as the timing for the D/A converter so that if there occur minute vibrations or jitter in the clock signal, the quality of sound is badly affected. Particularly, in the conventional system which generates the clocks from the DAI format signal Rx it is inevitable that jitter is mixed in the clock signal from the PLL circuit 7 of the receiver 2 in comparison with the master clock from the oscillator 3 of the transmitter 1.

DISCLOSURE OF THE INVENTION

The present invention was made in view of the above-mentioned defect and provides a digital transmission system which is capable of substantially constructing a clock system which can supply a timing for D/A conversion with extremely little jitter.

The digital transmission system according to the present invention is provided with a transmitter 11 and a receiver 12, wherein the transmitter 11 comprises first clock extracting means 13, 14 for detecting a synchronizing signal contained in a first digital audio interface (DAI) format signal from the receiver 12 and generating a first clock signal of a predetermined frequency and phase-locked with the synchronizing signal, data read-out means 4 for reading out data from a recording medium on the basis of the first clock signal, and a first encoder means 5 for encoding the data from the data read-out means 4 in a second digital audio interface (DAI) format signal on the basis of the first clock signal, while the receiver 12 comprises second clock extracting means 6, 7 for detecting a synchronizing signal contained in the second DAI format signal and generating a second clock signal of a predetermined frequency which is phase-locked with the synchronizing signal, decoding means 8 for decoding data from the second DAI format signal on the basis of the second clock signal, oscillating means 3 for generating a master clock, D/A converting means 9 for digital-to-analog converting the decoded data on the basis of the master clock, and a second encoding means 15 for encoding the master clock to derive the first DAI format signal.

Therefore, according to the digital transmission system of the present invention, it is possible to effect D/A conversion with a jitter-free clock signal to thereby achieve improvement on the quality of sound.

BRIEF DESCRIPTION OF THE DRAWINGS

FIGS. 3 and 4 are block diagrams respectively showing other embodiments of the present invention.

FIG. 6 is diagrams used for explaining the DAI format.

BEST MODE FOR CARRYING OUT THE INVENTION

Figure 1:
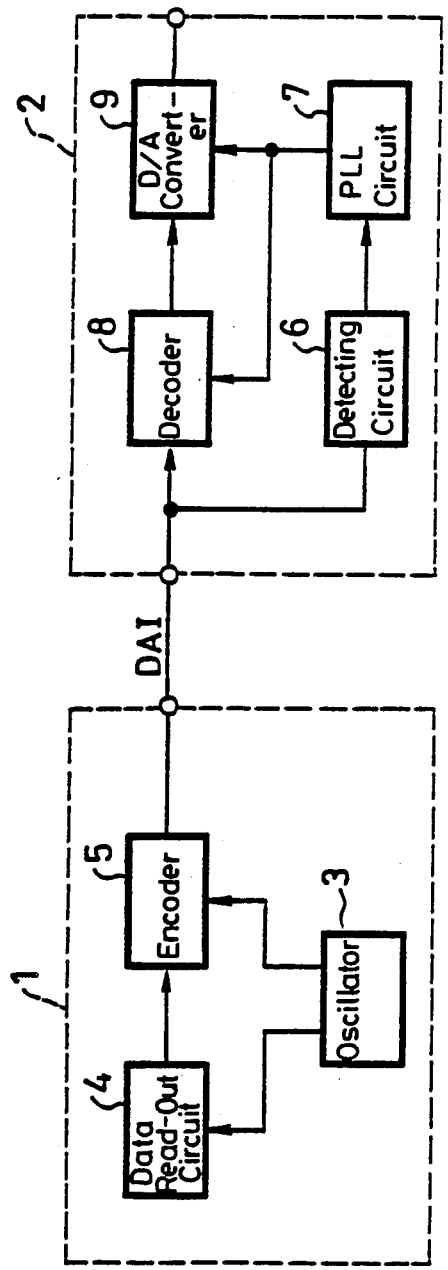
FIG. 1 is a block diagram showing a previously proposed example.

Several embodiments of the present invention will hereinafter be explained in detail with reference to FIGS. 2-4. In the respective figures, parts corresponding to those in FIG. 1 are designated with the same reference numerals and the detailed explanation thereof will be omitted.

Figure 2:
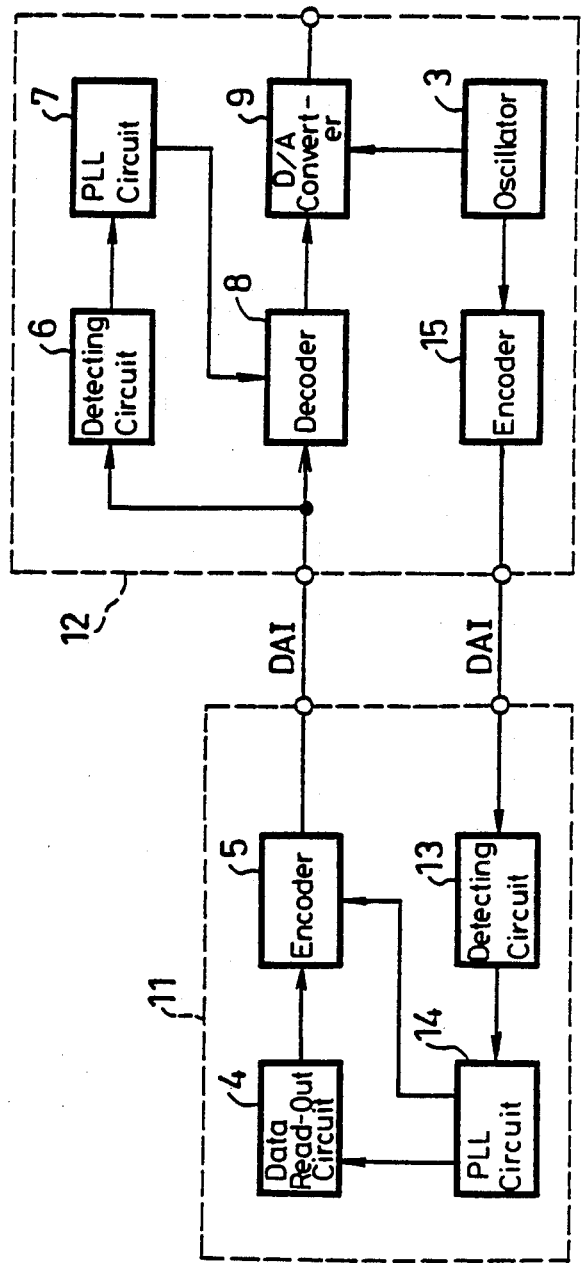
FIG. 2 is a block diagram showing an embodiment of the present invention.

FIG. 2 shows a circuit arrangement of a first embodiment according to the present invention. In the present embodiment, the oscillator 3 is built in the receiver 12 in a manner that the master clock from the oscillator 3 is supplied to the D/A converter 9 as a clock signal. Therefore, the clock signal is not supplied from the PLL circuit 7 to the D/A converter as shown in FIG. 1.

The master clock from the oscillator 3 is supplied to an encoder 15 used as the second encoding means, wherein the first DAI format signal is formed. The first DAI format signal does not include data, in which only the synchronizing signal having the frequency double the sampling frequency fs is inserted at a predetermined interval.

Meanwhile, the transmitter 11 is provided with a detecting circuit 13 and a PLL circuit 14 constituting the first clock extracting means, whereby the synchronizing signal contained in the first DAI format signal from the encoder 15 is detected by the detecting circuit 13. Then a clock signal having a predetermined frequency and phase-locked with the synchronizing signal is generated by the PLL circuit 14 and then supplied to the data read-out circuit 4 and the encoder 5 used as the first encoding means. The encoder 5 encodes the data read out on the basis of the clock signal from the PLL circuit 14 in the second DAI format signal.

The second DAI format signal is supplied to the detecting circuit 6, wherein the synchronizing signal is detected in the same manner as described above. A clock signal of a predetermined frequency is generated by the PLL circuit 7 in being phase-locked with this synchronizing signal and then supplied to the decoder 8. Incidentally, the detecting circuit 6 and the PLL circuit 7 constitute the second clock extracting means in this case.

In the present embodiment as described above, the master clock from the oscillator 3 is directly supplied to the D/A converter 9 so that the timing for D/A conversion does not contain any jitter, thereby improving the quality of sound. Additionally, although the clock signal supplied to the decoder 8 is transmitted through the two DAIs, they are synchronized with the oscillator 3, so that the whole system operates substantially as a synchronizing system.

Figure 3:
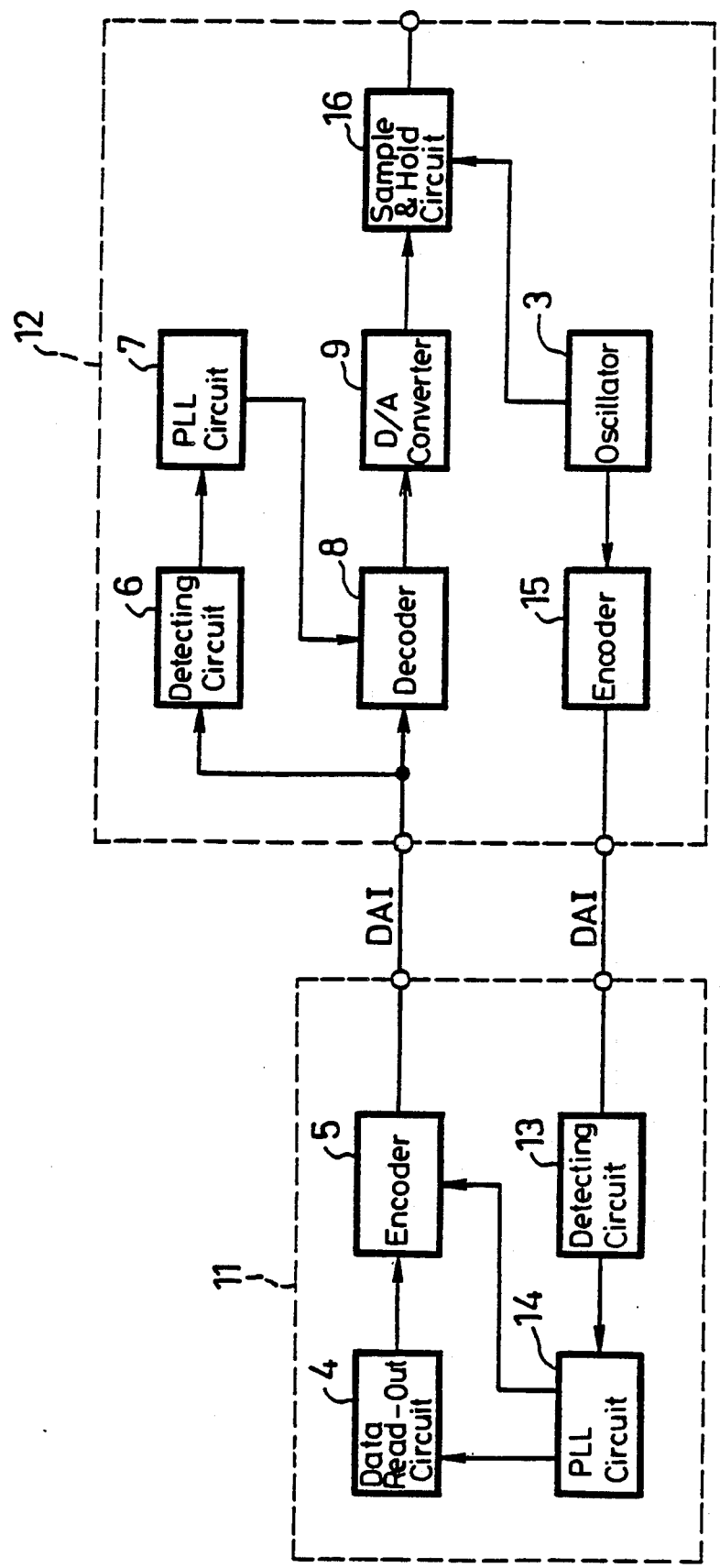
Figure 5A:
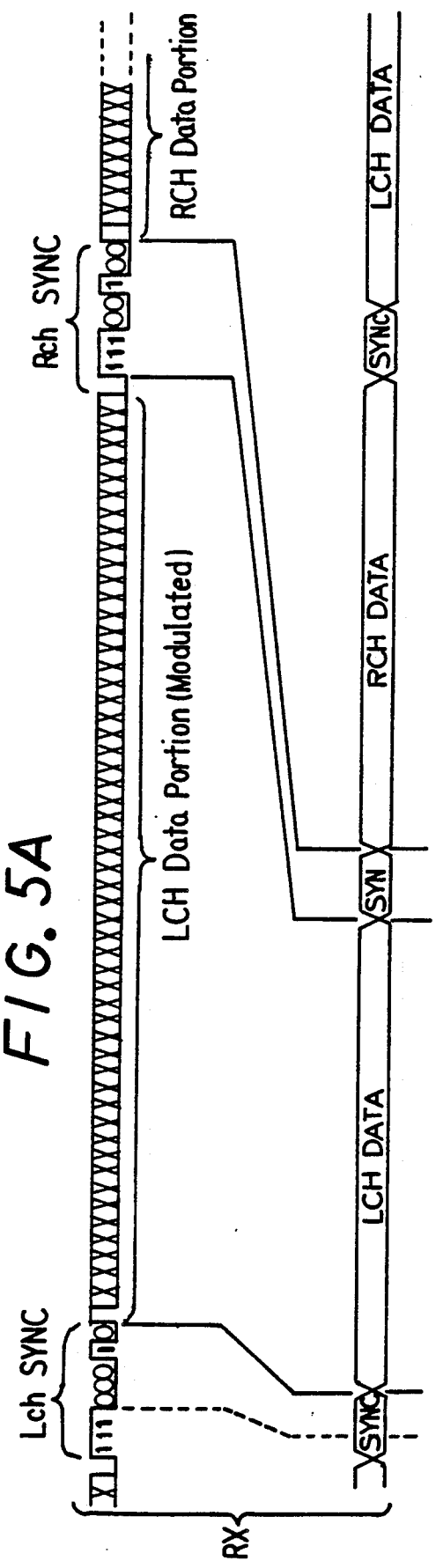
FIG. 5 is diagrams used for explaining the operation.
Figure 5B:
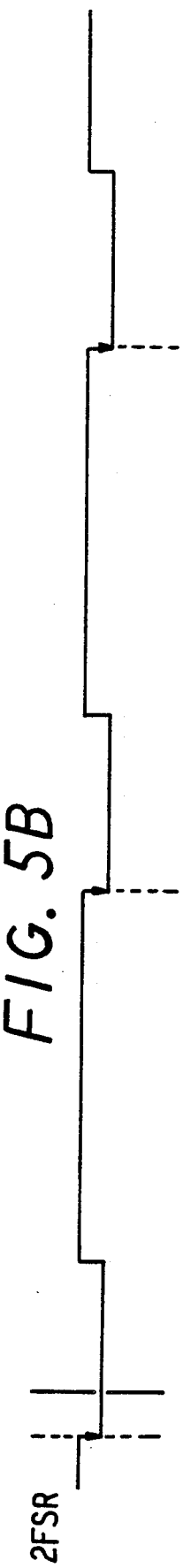
Figure 5C:
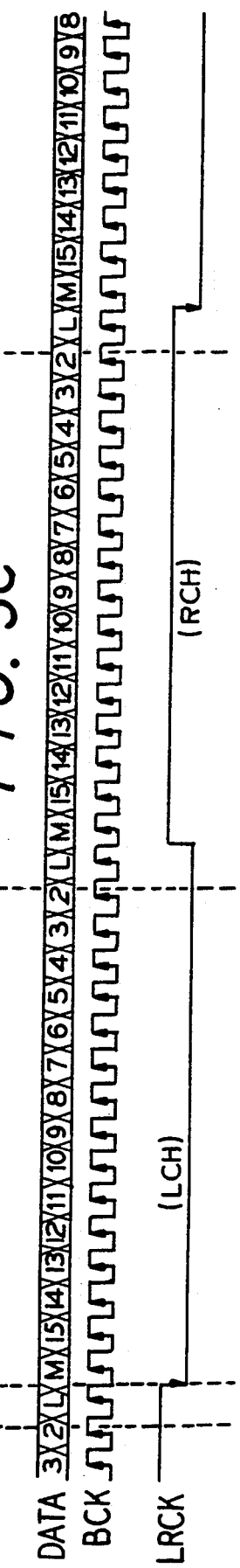
Figure 5D:
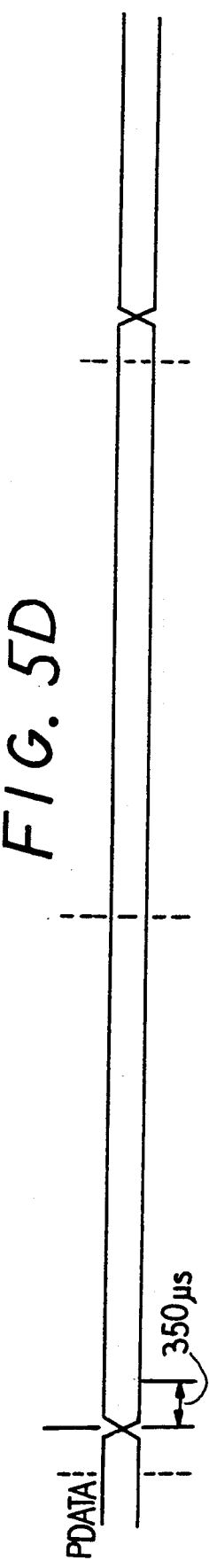
Figure 5E:
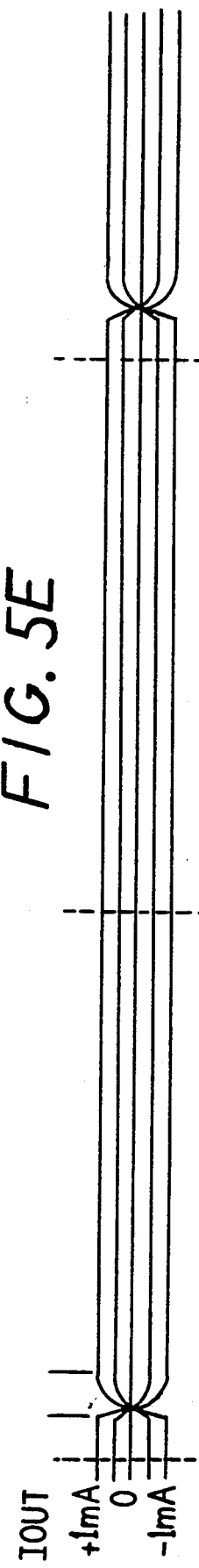
Figure 5F:
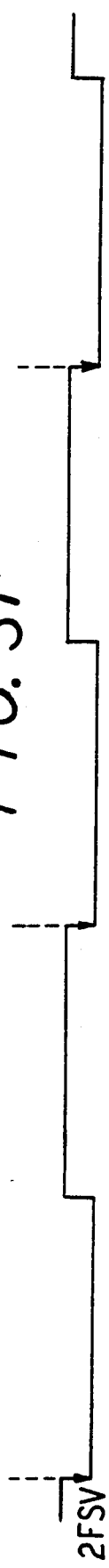

FIG. 3 shows a second embodiment of the present invention. In the present embodiment, a sample and hold circuit 16 is provided at the rear stage of the D/A converter 9, and the remainder of the construction is the same as that of FIG. 2. The sample and hold circuit 16 is supplied with a clock having substantially the same frequency as the sampling frequency fs generated at the timing of the master clock.

The present embodiment constructed as described above can also achieve substantially the same effects as those of the above-mentioned first embodiment and, moreover the present embodiment can remove noise which occurs in D/A conversion.

FIG. 4 shows a third embodiment of the present invention. In the present embodiment, a digital filter 17 for oversampling is provided before the D/A converter 9, and the remainder of the construction is the same as that of FIG. 2. The digital filter 17 is supplied with a master clock having a frequency, for example, 384 times or 256 times the sampling frequency fs. The D/A converter 9 is supplied with a clock from the digital filter 17 or exclusively from the oscillator 3.

The present embodiment constructed as described above can also achieve substantially the same effects as those of the above-mentioned first embodiment and moreover the present embodiment can shift harmonic noise which is caused in the D/A conversion to a high band, thereby making it possible to reduce the order of an analog filter, not shown, arranged after the D/A converter 9 to consequently simplify the construction of the analog filter, achieve improvement on the quality of sound and enhance the group delay characteristics.

As described above, conventionally since the master clock from the oscillator arranged in the transmitter side is received by the D/A converter through the DAI, it has been inevitable that jitter is mixed in the clock signal for effecting D/A conversion. However, according to the present invention the oscillator for generating the master clock is arranged in the receiver side in a manner that the master clock therefrom is directly supplied to the D/A converter and the master clock is transmitted through the DAI to the transmitter side so as to establish the synchronization with each other, so that the occurrence of jitter in the timing of the D/A conversion can be maximally suppressed and accordingly the quality of sound can be improved.

We claim:

1. A digital transmission system provided with a transmitter and a receiver, wherein said transmitter comprises first clock extracting means for detecting a synchronizing signal contained in a first digital audio interface format signal from said receiver and generating a first clock signal of a predetermined frequency in phase-locked relationship with the synchronizing signal, data read-out means for reading out data from a recording medium on the basis of the first clock signal, and a first encoder means for encoding the data from the data read-out means to produce, at an output, a second digital audio interface format signal on the basis of the first clock signal, while said receiver comprises second clock extracting means for detecting a synchronizing signal contained in the second digital audio interface format signal and generating a second clock signal of a predetermined frequency in phase-locked relationship with the synchronizing signal, decoding means for decoding data from the second digital audio interface format signal on the basis of the second clock signal, oscillating means for generating a master clock, D/A converting means for digital-to-analog converting the decoded data on the basis of the master clock, to produce an analog output, and a second encoding means for encoding the master clock to derive the first digital audio interface format signal.

2. A digital transmission system as claimed in claim 1, characterized in that a sample and hold circuit is connected to the output side of said D/A converting means and effects a sample and hold operation on the basis of said master clock.

3. A digital transmission system as claimed in claim 1, characterized in that a digital filter is connected to the input side of said D/A converting means and effects a filtering operation by said master clock.

4. A digital transmission system as claimed in claim 1, characterized in that said first or second digital audio interface format signal incorporates a synchronizing signal, digital audio data and control data in plural successive frames.

5. A digital transmission system as claimed in claim 4, characterized in that said first or second digital interface format signal is modulated in biphase mark.

* * * * *